(No Model.)
L. R. CHRISTIANI & D. D. GRIFFITHS.
APPARATUS FOR MANUFACTURE OF OIL AND WATER GAS.
No. 536,681. Patented Apr. 2, 1895.
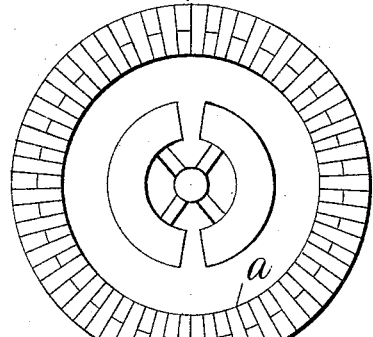
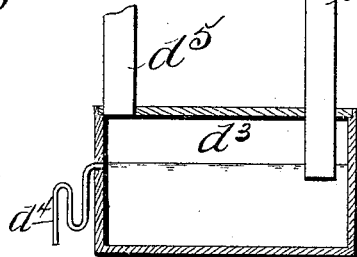
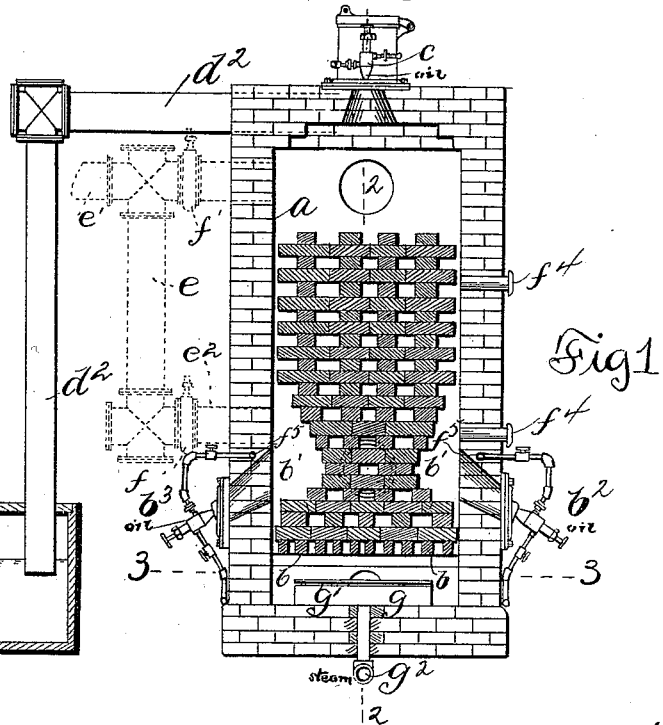
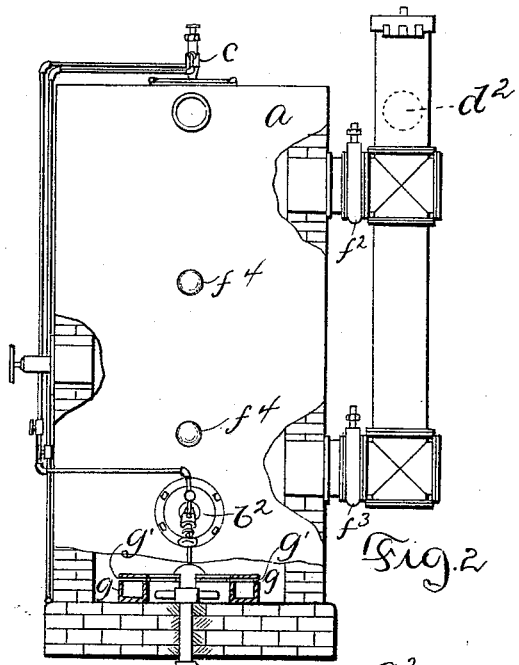
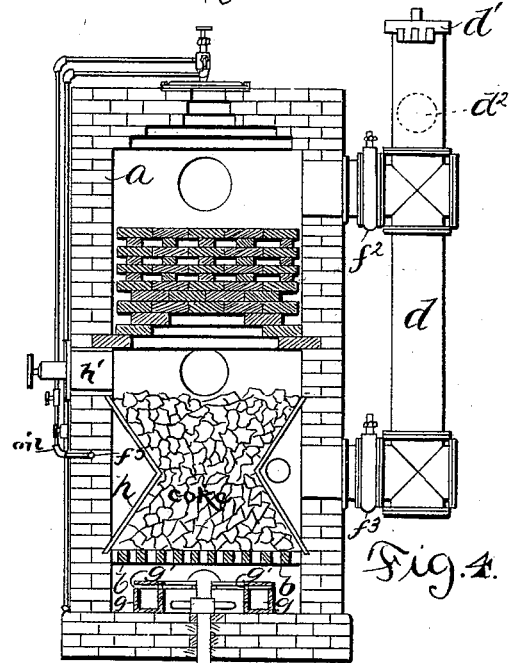
Witnesses:
George L. Cragg.
W. Clyde Jones.
Inventors
Daniel D. Griffiths
Louis R. Christiani
By Barton & Brown
Attorneys
THE NORRIS PETERS CO., PHOTO-LITHO., WASHINGTON, D. C.

UNITED STATES PATENT OFFICE.

LOUIS R. CHRISTIANI AND DANIEL D. GRIFFITHS, OF CHICAGO, ILLINOIS.

APPARATUS FOR MANUFACTURE OF OIL AND WATER GAS.

SPECIFICATION forming part of Letters Patent No. 536,681, dated April 2, 1895.

Application filed January 29, 1894. Serial No. 498,312. (No model.)

*To all whom it may concern:*

Be it known that we, LOUIS R. CHRISTIANI and DANIEL D. GRIFFITHS, citizens of the United States, residing at Chicago, in the county of Cook and State of Illinois, have invented a certain new and useful Improvement in Apparatus for the Manufacture of Oil and Water Gas, (Case No. 1,) of which the following is a full, clear, concise, and exact description, reference being had to the accompanying drawings, forming a part of this specification.

Our invention relates to the manufacture of oil and water gases, and its object is the provision of means whereby illuminating or fuel gas may be cheaply and efficiently manufactured from oil to produce a pure oil gas, or from oil and steam to produce an oil and water gas.

Our invention, in its preferred form, comprises a regenerator containing a checker-work of refractory material toward the bottom and toward the top of which are provided injectors adapted to convey the oil and steam into the regenerating chamber, steam and oil, in connection with air being first conveyed into the chamber to heat the refractory material to the proper degree, after which, all connection with the air having been cut off, intermixed oil and steam may be passed through the checker-work to form an oil and water gas; or oil alone may be brought in contact with the refractory material to produce a pure oil gas. The heating of the checker-work may be accomplished by alternate up and down blasts, thus effecting a more uniform distribution of the heat.

In making an oil and water gas the runs may be alternately made in opposite directions by the alternate use of the upper and lower injectors, thus permitting efficient runs of longer duration than is possible when the runs are made always in the same direction.

In making a pure oil gas, the upper oil injector is alone used during the gas run, and in this connection we believe ourselves to be the first to produce a pure oil gas that will stand high compression with small loss through the use of a checker-work of heated refractory material.

We will describe our invention in connection with the accompanying drawings, in which are illustrated several embodiments of our invention.

Figure 1 is a sectional view of a regenerator embodying our invention. Fig. 2 is a partial sectional view on line 2—2, Fig. 1. Fig. 3 is a sectional view on line 3—3, Fig. 1, showing the means of supplying air and steam below the grate bars. Fig. 4 is a sectional view of a modification.

Like letters refer to like parts in the several figures.

The walls $a$ of the regenerator may be made in any preferred manner, and of any suitable material. Near the bottom of the regenerating chamber is located a grate, composed of the grate bars $b$ $b$. Upon this grate is built a checker-work of refractory material, preferably in the form of fire bricks, the checker-work being so built that recesses $b'$ $b'$ will be formed just above the grate. Opposite the recesses $b'$ $b'$ are located the oil injectors $b^2$ $b^3$, which are preferably of the type adapted to atomize or spray the oil to thoroughly intermingle it with the steam. The object of the recesses $b'$ is to permit the oil and steam issuing from the injectors to thoroughly mingle before striking the checker-work. The provision of the recesses obviates the necessity of providing dog houses for the injectors.

The injectors are situated so that the jet of oil and steam will be directed obliquely upward to impinge against the checker-work. The injectors $b^2$ $b^3$ may be one or more in number and situated, when more than one, preferably at equidistant points around the periphery of the chamber.

A space is left between the top of the chamber and the upper surface of the checker-work, and in the top of the chamber is located an oil injector $c$ which may be of the same type as those located in the lower portion of the chamber.

A stack $d$ is provided opening into the chamber at two points, one at the top and the other near the bottom. The stack is provided with a cover $d'$ by means of which the top of the stack may be sealed gas tight.

Leading from the upper portion of the stack is a pipe $d^2$ which extends to a water seal $d^3$, of usual construction, and which may comprise an air tight tank filled to a certain level with water, into which the end of pipe $d^2$ extends, the water being kept at a definite level by the siphon $d^4$. A pipe $d^5$ extends from the top of the tank to the scrubber.

Instead of combining the stack with the pipe for the flow of the gas, the pipe $d^2$ may be replaced by the pipe $e$, which is provided with a limb $e'$ opening into the upper part of the regenerating chamber, and a limb $e^2$ opening into the lower part thereof. Valves $f f' f^2 f^3$ are provided in the various pipes opening into the chamber so that the pipes may be properly opened and closed. Peep holes $f^4$ may be provided for observing the condition of the refractory material within the regenerator.

To admit air beneath the grate bars to furnish oxygen during the blasting operation, air is forced through pipe $g^2$ into the air chambers $g\ g$, in the sides of which, and near the top, holes or slots $g'\ g'$ are provided through which the air emerges, being thus distributed over the grate area and preventing the burning of a core, as occurs when the air is passed through the grate bars in a concentrated stream. The air chamber is preferably made in two parts to facilitate casting, but may be made in one piece, or in more than two parts, the essential feature being the provision of means for distributing the air throughout the grate area.

A steam pipe $g^2$ may be connected with the air pipe so that, when desired, steam may be supplied beneath the grate bars.

To heat the oil before its passage into the regenerating chamber, the oil pipe $f^5$ may be located within the walls of the chamber so that the oil may receive heat from the chamber.

In Fig. 4 we have illustrated a modification of our invention, for use when it is desirable to use coke instead of oil for blasting. A coke receptacle $h$ is adapted to be inserted just above the grate, the coke being inserted through a door $h'$. Above the coke receptacle the checker-work may be built up, being supported from the sides of the regenerating chamber. In all other respects the construction may remain the same.

It will be observed that the regenerator may be readily changed at any time for the use of either oil or coke as a blasting fuel by the rearrangement of the separable parts above the grate bars.

We will first describe the method of manufacturing the oil and water gas.

The first operation is to blast the furnace to bring the refractory checker-work to the required degree of heat. This may be done by either an up or down blast. If by an up blast the lower stack opening is closed by valve $f^3$ and the upper one opened by valve $f^2$. Steam and oil from one or more of the lower injectors is then admitted and lighted by means of a piece of burning waste inserted through a peep hole. The injectors being situated at some distance from the checker-work through the employment of the recesses $b'$, the oil and steam become thoroughly intermingled before reaching the checker-work. Striking the checker-work they pass upward heating the refractory material, the products of combustion passing out through the stack. The injectors being situated obliquely the jet from one is prevented from striking against the opposite injector to burn it out. Through the provision of the recesses $b'$ and the placing of the injectors obliquely, the steam and oil are carried well toward the center of the checker-work to effect an even distribution of the heat. In making a down blast, the lower stack opening is opened, while the upper one is closed, the injector $c$ at the top being used for spraying oil and steam upon the top of the checker-work, the oil and steam passing downward to heat up the refractory material, the products of combustion passing out and up the stack. By making alternate up and down blasts the checker-work is kept at a more uniform temperature throughout, and longer and more efficient runs may, in consequence, be made. To supply air during the upward blasting, air may be admitted through the gate bars, being evenly distributed throughout the grate area by means of the air chambers, thus furnishing oxygen for the combustion of the oil. The refractory material having been brought to the required degree of heat, the supply of air, oil and steam is cut off, and the top of the stack is sealed by the cover $d'$. Supposing a down run is to be first made, the valve $f^2$ is closed and the valve $f^3$ is opened. Oil and steam are now sprayed upon the top of the checker-work by injector $c$, the oil and steam in passing downward through the checker-work being dissociated by the intense heat of the refractory material, the steam being decomposed into its chemical elements and the oil broken up into its hydro-carbon constituents, which reunite and pass up the gas outlet a fixed gas. The gas is then conveyed by means of pipe $d^2$ through the water seal and to the scrubber and purifier in the usual manner. When the run has been continued until the refractory material cools down below the efficient point, the supply of oil and steam is cut off and the furnace is again blasted, after which another gas run is made.

By our invention we are enabled to make alternate up and down gas runs by the alternate use of the upper and lower oil injectors. This is advantageous since the checker-work always cools more rapidly at the point where the relatively cold oil and steam are sprayed against it, and when runs are made continuously in one direction, this portion of the checker-work is always cooler than the exit end of the checker-work and determines the length of the efficient run. When, however, the run is reversed each time, the hottest portion of the checker-work is each time brought into the position to be impinged upon by the relatively cold oil and steam, and the run may be continued longer since it will take this hottest portion a longer time to cool down to the inefficient point.

In making the up gas run, the upper gas outlet is opened, the lower one being closed, and the oil and steam are supplied from one or more of the lower injectors. By thus making up and down blasts, and up and down gas runs, we are enabled more efficiently to utilize the heat than has been possible heretofore.

We will now describe the method of making pure oil gas, by which we mean a gas which shall contain no trace of dilutents such as air or steam, and, in consequence, is capable of withstanding high compression with small loss.

We are aware that it has been proposed heretofore to make an oil gas by the use of checker-work, the oil being forced through the checker-work by means of steam, the steam being afterward condensed by passing the mixture through water, but we find that such a gas is not a pure oil gas as it contains traces of steam, and, consequently, will not withstand a high compression without considerable loss of volume and candle power.

The furnace having been blasted, the lower gas outlet is opened, the upper one being closed, and oil alone is sprayed upon the top of the checker-work. The oil passes downward, coming in contact with the heated refractory material and being decomposed into its constituent elements, which, as a fixed gas, pass into the gas outlet.

In making the oil gas, the temperature of the refractory material should be kept at an even heat, and we find that a heat just verging into cherry red gives the desired results. If the heat be permitted to become a complete cherry red, lamp black will be deposited, the oil being broken up into its constituent chemical elements, and the carbon, the illuminant element, deposited on the refractory material. On the other hand, if the temperature be too low, incomplete decomposition will result, with the formation of a tar. When the temperature is of the proper degree, the oil is broken up into its constituent hydrocarbons, some saturated and some unsaturated, the excess of carbon being deposited upon the refractory material from which it is removed by the succeeding blasting process. To remove the unsaturated hydrocarbons, the presence of which in the completed gas would cause a loss in volume under pressure, the mixture is passed through a water seal. Crude oils, and their distillates, are usually employed in the manufacture of the gas, and an analysis at this stage of a gas produced from one of these oils, technically known as "blue oil" having a specific gravity of about 0.85, gives—hydrogen, 16.85 per cent.; unsaturated hydrocarbons, 44.83 per cent.; ethane, 17.3 per cent.; methane, nineteen per cent.; carbon dioxide, 0.63 per cent.; oxygen, 0.24 per cent.; nitrogen, 1.15 per cent.

The presence of the small quantities of oxygen and nitrogen is due to the fact that a small amount of air enters with the oil, and, further, a small quantity of air may remain after the blasting operation. The mixture is then passed through the washers, scrubbers, condensers and purifiers, and the ethane, methane and carbon dioxide removed. The ethane and methane are removed before the mixture reaches the purifier as they unite with the iron oxide employed in the purifier and impair its action. Furthermore, it is found that their presence in the illuminating gas decreases the candle power.

In making oil and water gas it is not so essential to maintain the definite and even temperature of the refractory material, since the steam acts as an envelope for the oil, and the surplus heat will attack the steam rather than the oil; but the temperature should not be allowed to fall below that at which breaking up of the oil into its hydrocarbon constituents results, as the oil would then be converted into a tar. If the temperature be increased to too great an extent, the oil will be completely broken up into its chemical elements, carbon and hydrogen, and the gas manufacture will be defeated, but in making the oil and water gas a much higher heat may be used than in making oil gas.

When coke is used as the blasting fuel, as illustrated in Fig. 4, the air for the blasting process may be admitted in the same manner through the air chambers $g\ g$. In making water gas, the oil may be admitted through the injector $c$, preferably with enough steam to carry the oil well into the checker-work, while the necessary steam may be supplied through the air chambers $g\ g$ or through the injectors $b^2\ b^3$, the upper gas outlet being opened, while the lower one is closed; or, the lower outlet being opened, oil and steam may be supplied only from the upper injector $c$, thus making a down gas run. In making a pure oil gas the lower gas outlet may be opened, and oil alone sprayed unto the checker-work from the upper injector $c$, the oil passing downward through the checker-work, and out the lower gas outlet.

It is evident that our invention is susceptible of other embodiments than those above described, and we do not, therefore, desire to limit ourselves to precise constructions, but

We claim as new and desire to secure by Letters Patent—

1. The combination with a regenerating chamber, of a checkerwork of refractory material therein, said chamber being provided at the lower portion with a recess having an oblique upper wall, an obliquely situated oil inspirator located opposite said recess, the nozzle thereof being directed obliquely upward to spray oil against said oblique wall, said wall being constructed and arranged to permit the passage therethrough of the oil vapor from said obliquely situated oil inspirator, substantially as described.

2. The combination with a single regenerating chamber, of a checkerwork of refractory material therein, said checkerwork being provided at the lower portion with diametrically situated recesses having oblique upper walls, an obliquely situated oil inspirator located opposite each of said recesses, the nozzle thereof being directed obliquely upward to spray the oil upon the upper oblique wall, substantially as described.

3. The combination with a single regenerating chamber, of checkerwork of refractory material therein, said checkerwork being provided at the lower portion with diametrically situated recesses having oblique upper walls, an obliquely situated oil inspirator located opposite each of said recesses, the nozzle thereof being directed obliquely upward to spray the oil upon the upper oblique wall, and an oil inspirator situated above said checkerwork, the nozzle thereof being directed vertically downward to spray the oil upon the top of said checkerwork, substantially as described.

In witness whereof we hereunto subscribe our names this 22d day of January, A. D. 1894.

LOUIS R. CHRISTIANI.
   DANIEL D. GRIFFITHS.

Witnesses:
 W. CLYDE JONES,
 GEORGE L. CRAGG.